United States Patent [19]

Page et al.

[11] 3,739,802

[45] June 19, 1973

[54] CONTROL VALVES FOR SPRING BRAKE UNITS

[75] Inventors: Wilbur Mills Page, Ralph Coupland, both of Lincoln, England

[73] Assignee: Clayton Dewandre Company Limited, Lincoln, England

[22] Filed: Mar. 31, 1971

[21] Appl. No.: 129,900

[30] Foreign Application Priority Data
Apr. 1, 1970   Great Britain.................. 15,415/70

[52] U.S. Cl............... 137/116.3, 137/627.5, 303/54
[51] Int. Cl..................... G05d 16/04, F16k 31/524
[58] Field of Search..................... 137/116.3, 116.5, 137/627.5; 91/433; 303/54, 59, 60

[56] References Cited
UNITED STATES PATENTS

| 3,031,234 | 4/1962 | Alfieri | 303/54 |
| 2,957,730 | 10/1960 | Keller et al. | 303/59 |
| 3,482,591 | 12/1969 | Dufresne | 137/116.5 |
| 2,087,356 | 7/1937 | Parker | 303/54 |
| 2,389,058 | 11/1945 | Kelley | 303/54 |
| 2,433,925 | 1/1948 | Rush et al. | 91/427 |
| 1,739,378 | 12/1929 | Slagle | 303/54 |
| 2,208,553 | 7/1949 | Hussong | 303/54 |
| 3,416,843 | 12/1968 | Kobnick | 303/54 |

Primary Examiner—Robert G. Nilson
Attorney—Norris & Bateman

[57] ABSTRACT

A manually-operable valve for controlling the application of a spring-actuated fluid pressure-released brake unit in a full power hydraulic braking system comprises a valve element actuated by a control valve plunger and operable to connect the chamber of a spring brake unit selectively and gradually to a source of fluid pressure and to a sump, and manually-operable means actuating the plunger through rotary cam means and a graduated spring, the delivered fluid pressure reacting against the spring such that the pressure delivered is determined by the degree of travel of the manually-operable means.

3 Claims, 2 Drawing Figures

Patented June 19, 1973

3,739,802

INVENTORS
WILBUR MILLS PAGE
RALPH COUPLAND

BY *Norris & Bateman*
NORRIS & BATEMAN

CONTROL VALVES FOR SPRING BRAKE UNITS

This invention relates to fluid pressure operated braking systems for motor vehicles and of the kind incorporating spring brake units, that is, units comprising a spring-loaded piston and cylinder device of which the piston is operatively connected to the brakes or brake linkage and is acted upon by a supply of pressure fluid such that the piston is normally held in an inoperative position but, by reduction or release of the fluid pressure acting thereon, can be permitted to move under the action of the loading spring to apply the brakes. The present invention is concerned more particularly with full power hydraulic braking systems incorporating pumping means and accumulator means for maintaining a constant pressure within the system and valve means for controlling the application and release of hydraulic power to and from the brake units, and it is the main object of the present invention to provide an improved and simplified form of hand-operated valve for controlling the application of the spring brake units in systems of this character. More specifically, the invention provides a control valve for the purpose mentioned in which the pressure delivered through the valve is determined by the degree of movement of a control handle and in which the maximum delivery pressure is quickly and easily adjustable whereby the valve can be readily adapted to accommodate manufacturing tolerances and ensure efficient operation.

According to the invention the improved control valve comprises a valve body, a control valve plunger displaceable axially in a bore in said body and a valve element operable by said plunger to connect the fluid pressure chamber of a spring brake unit alternatively to a source of pressure fluid or to a return line leading to a reservoir or sump, said control valve plunger being displaceable by manually-operable means and through a graduated spring and a rotary cam device, and the fluid pressure delivered reacting against the force of said graduating spring such that the pressure delivered through the valve is dependent upon the degree of spring loading and thereby upon the degree of movement or travel of the manually-operable means.

Reference will now be made to the accompanying drawings which illustrate a preferred embodiment of the invention and wherein.

Figure 1:
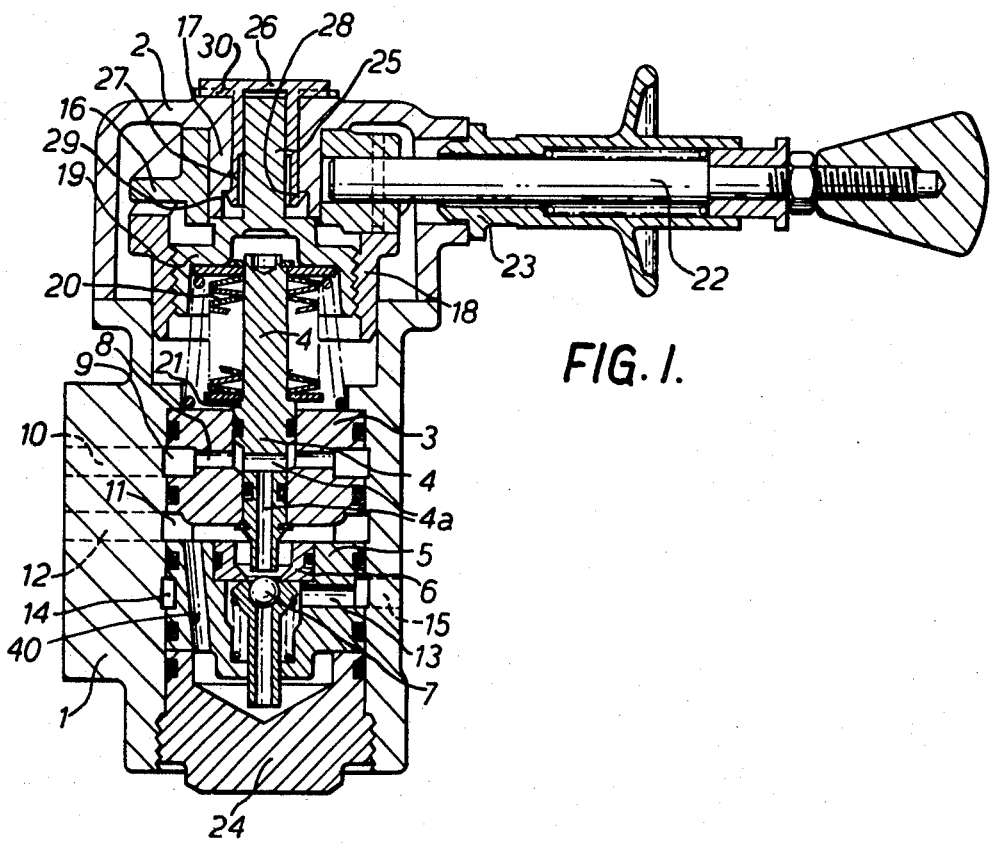
FIG. 1 is an axial section through the control valve unit.

The control valve unit shown comprises a vertically-disposed substantially cylindrical housing 1 having an axial bore within which is accommodated a valve assembly, and a cap structure 2 detachably secured upon the upper end of the housing by bolts (not shown) and accommodating the manually-operable valve-actuating means. The valve assembly includes an upper valve body section 3 having an axial bore within which is slidably displaced a hollow control valve plunger 4 and a lower valve body section 5 also having an axial bore terminating at its upper end in a counterbore receiving an annular valve seating 6, a ball valve 7 being spring-loaded towards said seating and its engagement therewith being controlled by the control valve plunger 4 as hereinafter described. Radial passages 8 in the valve body section 3 connect the bore of said section to an annular chamber 9 which in use is connected by an exhaust port 10 in the housing and external conduits to the system reservoir or sump, whilst an annular chamber 11 between the two valve body sections is connected by a delivery port 12 in the housing to the chamber of the spring brake unit to be controlled. Finally, a further radial passage 13 in the valve body section 5 connects the bore of that section at a point below the valve seating 6 with an annular chamber 14 communicating by means including an inlet port 15 in the housing with a pressure fluid supply, e.g., the accumulator of the system.

Within the cap structure 2 is disposed a cam ring 16 rotatably mounted on a hub structure 17 depending from the upper wall of the cap, and a co-acting annular cam 18 guided for axial movement in the upper end of the housing and within which is secured an inverted cup-shaped thrust member 19, a stack of disc springs 20 constituting a graduated spring structure being interposed between said thrust member and a shoulder 21 on the control valve plunger 4. The cam ring 16 is rotatable by a control handle 22 extended radially through the side wall of the cap 2 and secured at its inner end to said cam ring. The cap is slotted to permit horizontal movement of the handle about the unit axis, a manually-releasable spring-loaded detent 23 being slidably mounted on the handle and in the position shown corresponding to "brakes full on," engaging a recess in the housing cap to lock the handle in this position.

The cam ring 16 has a plurality of equally-spaced lobes i.e. three or more, and the mating annular cam 18 is correspondingly formed, the arrangement being such that rotation of the cam ring by the handle displaces the annular can and thrust member 19 axially, this movement being transmitted through the graduated spring 20 to the control valve plunger 4. The mechanism operates as follows:

Under normal running conditions the handle 22 is in the position to depress the plunger 4 and hold it in engagement with the ball valve 7 thereby closing off the exhaust or reservoir connection 10. Valve 7 is moved to open position at this time and delivery pressure is communicated through passage 40 to the underside of valve 7. The valve is in a lap condition maintaining pressure in the line to the spring brake unit to hold said unit inoperative. When it is desired to apply the spring brake the handle is moved away from the "brakes off" position reducing the loading on the plunger and permitting the ball valve 7 to engage firmly the seating 6. Delivery pressure acting through passage 40 tends to displace valve 7 upwardly toward closed position. The hollow stem of the plunger is also withdrawn from the ball valve 7 so connecting the spring brake chamber to exhaust through the passages 4a in the plunger. As the pressure in the brake connected chamber 11 falls the plunger descends under the force of springs 20 and a lap condition is again established, the delivery pressure at which the valve recloses being dependent upon the tension of the graduated spring and thereby upon the degree of movement of the control handle from its initial position. Should the handle be moved to the limit "brakes full on" position the valve assumes the condition shown in the drawing with the detent 23 engaging its recess to hold the handle against further movement, the plunger 4 in this condition being held away from the ball valve 7 so maintaining communication between the exhaust port 10 and the brake connected port 12. If desired, the cam elements 16, 18 may be profiled to provide an initial quick pressure drop when moving away from the "brakes-off" position in order to achieve a rapid take up of brake clearance through the spring brake and provide an improved graduated travel at the valve.

A feature of the improved value unit is the manner of construction, including the use of castings without difficult core passages and which permit rapid assembly and maintenance, the valve bodies 3, 5 being inserted in the housing 1 from below and retained therein by a screwed plug 24 or equivalent means, whilst the cam assembly and thrust member can be readily mounted within the cap and the upper end of the housing prior to assembly of these components.

Figure 2:
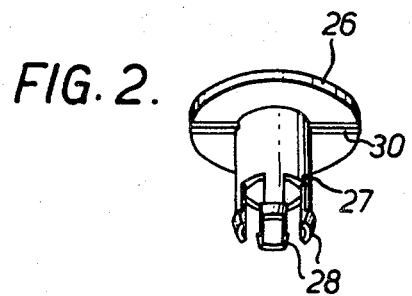
FIG. 2 shows a detail.

As previously mentioned, another feature of the improved valve is the provision of means permitting easy and rapid adjustment of the maximum delivery pressure as required. As shown, the thrust member 19 has screw-threaded connection with the cam element 18 and also has a square, hexagonal or other non-circular stem 25 located within the bore of the hub structure 17. Thus with the fingers or with the aid of a spanner inserted into the bore from above it is possible to rotate the thrust member relative to cam element 18 to adjust the tension of spring stack 20 and so accurately set the delivery pressure at which the spring brake moves to the "off" condition. The bore of the hub structure is normally closed by a hollow plug 26 preferably formed of a plastics material, said plug, which is shown in detail in FIG. 2, having a shank 27 which has externally an interference fit with the bore of the hub structure and internally a bore of a cross-sectional form to provide a free sliding fit on the stem 25. The shank 27 is slotted over its lower portion to define legs which include lugs 28 on their lower ends adapted to locate within an undercut portion 29 of the hub 17 to retain the plug in position. The head of the plug 26 is formed on its underside with a diametrically-extending key 30 engagable selectively with a series of complementary radial grooves in the upper face of the cap 2. Thus when inserting the plug the legs on the shank are entered between the flats on the stem 25 and the bore of hub 17 and the plug is then rotated slightly to align the key 30 with the nearest grooves in the cap. The plug is then pushed in fully such that the legs spring outward to engage the lugs 28 in the undercut portion 29, this arrangement having been found adequate to prevent rotational movement of the stem 25 whilst permitting free axial movement of the stem as the brakes are applied.

We claim:

1. A control valve for use in a vehicle braking system comprising a valve body having a bore, a plunger displaceable axially in said bore, a valve element operable by said plunger to connect a passage adapted to be connected to a spring brake unit alternatively to a passage adapted to be connected to a source of fluid pressure and to a passage adapted to be connected to a reservoir return or exhaust line, a manually operated cam ring mounted on said body for rotation coaxially of said bore, an annular cam member operatively associated with said cam ring and guided for movement axially of said bore, a thrust member adapted to be fixed on said cam member, said thrust member having a screw threaded connection with said cam member and having a stem accessible from the exterior of the control valve for the purpose of rotating said thrust member to desired adjusted operationally fixed position, and spring means interposed as a motion transmitting means between said thrust member and said plunger, the arrangement being such that the delivered fluid pressure supplied to said brake-connected passage reacts upon said plunger against the force of said spring means whereby said delivered fluid pressure is dependent on the degree of spring loading and thereby on the degree of rotation of said cam ring.

2. A control valve as claimed in claim 1, in which the stem of the thrust member is disposed in an opening in the valve body which is normally closed by a plug operable to secure said stem against unintentional rotation.

3. A control valve for use in a vehicle braking system comprising a valve body having a bore, a plunger displaceable axially in said bore, a valve element operable by said plunger to connect a passage adapted to be connected to a spring brake unit alternatively to a passage adapted to be connected to a source of fluid pressure and to a passage adapted to be connected to a reservoir return or exhaust line, a manually operated cam ring mounted on said body for rotation coaxially of said bore, an annular cam member operatively associated with said cam ring and guided for movement axially of said bore, a thrust member adjustably mounted on said cam member, and spring means interposed as a motion transmitting means between said thrust member and said plunger, adjustment of said thrust member being effective for varying the operative force of said spring means and the arrangement being such that the delivered fluid pressure supplied to said brake-connected passage reacts upon said plunger against the force of said spring means whereby said delivered fluid pressure is dependent on the degree of spring loading and thereby on the degree of rotation of said cam ring.

* * * * *